(12) United States Patent
Takahashi et al.

(10) Patent No.: US 7,884,789 B2
(45) Date of Patent: Feb. 8, 2011

(54) DISPLAY APPARATUS

(75) Inventors: Rintarou Takahashi, Tokorozawa (JP); Takashi Akiyama, Sayama (JP)

(73) Assignee: Citizen Holdings Co., Ltd., Tokyo (JP)

( * ) Notice: Subject to any disclaimer, the term of this patent is extended or adjusted under 35 U.S.C. 154(b) by 1032 days.

(21) Appl. No.: 11/659,826

(22) PCT Filed: Aug. 11, 2005

(86) PCT No.: PCT/JP2005/015043
§ 371 (c)(1), (2), (4) Date: Feb. 9, 2007

(87) PCT Pub. No.: WO2006/016719
PCT Pub. Date: Feb. 16, 2006

(65) Prior Publication Data
US 2008/0191984 A1    Aug. 14, 2008

(30) Foreign Application Priority Data
Aug. 12, 2004   (JP)  .............................. 2004-234957

(51) Int. Cl.
G09G 3/36    (2006.01)
(52) U.S. Cl. ........................................ 345/88; 102/690
(58) Field of Classification Search .................. 345/88, 345/102, 690
See application file for complete search history.

(56) References Cited
U.S. PATENT DOCUMENTS
6,188,379 B1 *  2/2001  Kaneko ....................... 345/102
6,439,731 B1 *  8/2002  Johnson et al. ................ 362/29
2001/0043179 A1 * 11/2001  Yoshinaga et al. ............. 345/87
2003/0132901 A1 *  7/2003  Shimada ....................... 345/87
2004/0017348 A1 *  1/2004  Numao ......................... 345/92
2004/0041781 A1 *  3/2004  Sato et al. .................... 345/102

FOREIGN PATENT DOCUMENTS

| JP | 8-211361 | 8/1996 |
| JP | 09-274471 | 10/1997 |
| JP | 2000-214435 | 8/2000 |
| JP | 2003-107424 | 4/2003 |
| JP | 2004-86081 | 3/2004 |
| JP | 2004-177873 | 6/2004 |

* cited by examiner

*Primary Examiner*—Amare Mengistu
*Assistant Examiner*—Koosha Sharifi
(74) *Attorney, Agent, or Firm*—Finnegan, Henderson, Farabow, Garrett & Dunner, L.L.P.

(57) ABSTRACT

The object of the invention is to provide an FSC display apparatus that can easily achieve color balance. The display apparatus (1) according to the present invention, which includes a light source (30) for emitting a plurality of colored lights in sequence and in a repetitive manner and a display section (14) for controlling transmission or reflection of the lights emitted from the light source, produces a color display by dividing each field into a plurality of subfields and by causing a designated one of the plurality of colored lights to be emitted at least during a part of a period within the plurality of subfields thereby displaying on the display section an image corresponding to the designated colored light, wherein each of the subfields includes at least a data writing period for writing display data to the display section and a light-emission period for emitting the designated colored light, and the end timing of the light-emission period can be set in a variable manner.

2 Claims, 8 Drawing Sheets

PRIOR ART

DISPLAY APPARATUS

FIELD OF THE INVENTION

The present invention relates to an FSC (Field Sequential Color) display apparatus and, more particularly, to an FSC display apparatus wherein provisions are made to correctly adjust color balance.

BACKGROUND OF THE INVENTION

In an FSC display apparatus, a color display is achieved by causing a plurality of colored lights (for example, of three primary colors, red, green, and blue) to be emitted in sequence and in a repetitive manner thereby displaying images corresponding to the respective colored lights.

One known example of such FSC display apparatus is an FSC liquid crystal color display apparatus which produces a color display by causing a plurality of colored lights (for example, of three primary colors, red, green, and blue) to be emitted in sequence and in a repetitive manner thereby displaying images corresponding to the respective colored lights on a liquid crystal display screen. A liquid crystal panel, such as a reflective liquid crystal panel, a transmissive liquid crystal panel, or a transflective liquid crystal panel, is used as the display screen of the FSC liquid crystal color display apparatus.

The above has described that the present invention can be applied to a liquid crystal display panel that uses a liquid crystal material as an electro-optical conversion material. The present invention can also be applied to an FSC display apparatus that uses a light control member or light control element such as described below, in which case the effect of the present invention can also be obtained.

Another example of the display apparatus is a display apparatus based on a technology called DLP (Digital Light Processing) developed by Texas Instruments, USA. This display apparatus has been on the market as a projection display apparatus. The core technology of the DLP is the DMD (Digital Micromirror Device) which is implemented on an optical semiconductor chip. The DMD comprises an array of 480,000 to 1,310,000 independently movable mirrors fabricated on a CMOS semiconductor chip. In the DLP, light from a lamp is projected onto the DMD and the light reflected by the mirrors of the DMD is projected through a lens for display.

The FSC display system is promising as a display system for a low-power liquid crystal display apparatus, because this display system does not use color filters and hence there is no loss of light associated with the use of color filters. However, a problem in an FSC display apparatus is the adjustment of color balance. Generally, in an FSC display apparatus, light-emitting diodes of three primary colors, red, green, and blue, are flashed in sequence and in a repetitive manner. However, because of differences in light-emitting efficiencies of the three color LEDs, it is not easy to obtain a correct color balance.

As one solution to this problem, there is proposed a technique that adjusts the color balance by changing the length of the subfield period for each color (for example, refer to patent document 1).

FIG. 14 is a diagram for explaining the technique that changes the length of the subfield period for each color.

In the technique shown in FIG. 14, one field period T is divided into three subfields, an R-subfield tR for red light emission, a G-subfield tG for green light emission, and a B-subfield tB for blue light emission, and the color balance is adjusted by changing the relative length of each subfield period. Here, the field frequency of one field is 60 Hz, and one field period T is therefore 16.67 ms.

In the technique shown in FIG. 14, the 16.67 ms period is not divided into three equal subfields, but is divided in such a manner that when the B-subfield period tB is made longer, the R-subfield period and the G-subfield period are made correspondingly shorter to adjust the color balance. That is, the color balance is adjusted by changing the relative length of the emission time of each color.

Such a color balance adjustment is possible because the FSC display apparatus produces a display by utilizing the accumulated response of the human eye.

Generally, the response speed of a liquid crystal display is slow and, because of this, the liquid crystal display has the problem that, if a light source is activated during the period that display data of a given pixel is being written (or immediately after the data is written), color uniformity or the color balance relative to other colors is deteriorated because a display is produced only matches the partially changed state of the liquid crystal.

To avoid this problem, there is proposed a technique in which, after the display data of each pixel has been written in each subfield, a prescribed time is allowed for the liquid crystal to respond, after which the light source is activated, thus preventing the color produced in one subfield from mixing into the color produced in another subfield (for example, refer to patent document 2).

FIG. 15 is a diagram for explaining the technique for activating the light source after waiting until the liquid crystal responds.

In the technique shown in FIG. 15, one field period T is divided into three subfields, an R-subfield tR for red light emission, a G-subfield tG for green light emission, and a B-subfield tB for blue light emission. The R-subfield tR is further divided into a writting period twr, a response period twa, and a light-emission period twi. Likewise, each of the G-subfield tG and the B-subfield tB is also divided into three periods.

In the R-subfield tR, data to be displayed in red on the liquid crystal display is written during the writting period twr, which is followed by the response period twa which allows a time for each pixel of the liquid crystal to change state in response to the thus written data, and the red light is emitted in the light-emission period twi. In this way, the red light is not emitted during the writting period twr or the response period twa. That is, to avoid the problem that color uniformity or the color balance relative to other colors is deteriorated, the light source is not activated until each pixel of the liquid crystal changes to the state that matches the red display data.

In the technique shown in FIG. 15, each subfield begins in synchronism with the beginning of the writting period of the corresponding color.

The technique shown in FIG. 15 also involves the following problem. The problem is associated with the slow response of the liquid crystal device.

When a TN or STN mode liquid crystal device is used for the liquid crystal display apparatus, if the response speed is increased by reducing the cell gap, it still takes about 2 ms until the transmittance characteristics of the liquid crystal device stabilize. Further, it takes about 1 ms to write data to be displayed on the liquid crystal display apparatus, even in the case of a small-screen QVGA-class display panel of 320 dots×240 dots. As earlier described, one field period T is generally about 16.67 ms, but the length of the field period cannot be made longer than that because of the problem of flicker. Therefore, the average length of one subfield taken over the three subfields into which one field is divided is about 5.56 ms or less. As shown in FIG. 15, when the 1 ms time required to write data to the liquid crystal display device and the 2 ms time allowed for the transmittance characteristics of the liquid crystal device to stabilize are subtracted from the 5.56 ms time, the time left for flashing the light source is only about 2.56 ms. Such a short light-emission flashing period leads to the problem that the display brightness decreases when a conventional light source is used.

One method to avoid this problem is to lengthen the light-emission period by shortening the liquid crystal response wait period, for example, to about 1 ms. While this method serves to retain the brightness of the liquid crystal display, there still remains the problem of color nonuniformity, or brightness nonuniformity, because sufficient time is not allowed for the transmittance characteristics of the liquid crystal device to stabilize.

The patent document 2 further describes that the color balance is adjusted by varying the ON time of the light source. To describe with reference to FIG. 15, in the method described in the patent document 2, the rise timing of the light-emission period twi is changed, but the fall timing is made to coincide with the end timing of the subfield. This method is simple in terms of the control circuit configuration.

However, when the color balance is adjusted by changing the rise timing of the light-emission period twi, as the transmittance characteristics of the liquid crystal device are not stabilized by the time when the light-emission period twi rises, there arises the problem that the amount of adjustment differs depending on the position on the liquid crystal display screen and that the liquid crystal is affected by variations in temperature. The reason for this will be described with reference to FIG. 16.

FIG. 16 is a diagram showing the transient response of the transmittance rate of the liquid crystal device.

In FIG. 16, the ordinate represents the transmittance rate S, and the abscissa represents the time T elapsed from the time that the writing of data to the liquid crystal display is started. It is assumed here that the liquid crystal display comprises a plurality of liquid crystal elements which are selected and sequentially driven as the respective scan lines are scanned. In FIG. 16, a curve 40 shows the characteristic of the first selected liquid crystal element at normal temperature, a curve 42 shows the characteristic of the first selected liquid crystal element at low temperature, and a curve 44 shows the characteristic of the first selected liquid crystal element at high temperature. Likewise, a curve 41 shows the characteristic of the last selected liquid crystal element at normal temperature, a curve 43 shows the characteristic of the last selected liquid crystal element at low temperature, and a curve 45 shows the characteristic of the last selected liquid crystal element at high temperature.

At normal temperature, the transmittance of the first selected liquid crystal element (see the curve 40) begins to rise when time t0 has elapsed from the beginning of the data writting (T=0). When time t1 has elapsed, the transmittance rate of the first selected liquid crystal element reaches about ½ of its stable state and, when time t1+t2 has elapsed, it reaches a substantially stable state. At low temperature, the first selected liquid crystal element exhibits a characteristic somewhat delayed in time (see the curve 42) compared with the characteristic at normal temperature and, at high temperature, it exhibits a characteristic somewhat advanced in time (see the curve 44) compared with the characteristic at normal temperature.

Data writing to the last selected liquid crystal element is started with a delay of time t1 with respect to the first selected liquid crystal element. Accordingly, the transmittance rate of the last selected liquid crystal element (see the curve 41) begins to rise when time t0 has elapsed from the beginning of the data writting (T=t1). When time t1+t2 has elapsed, the transmittance rate of the last selected liquid crystal element reaches about ½ of its stable state and, when time t1+t2+t3 has elapsed, it reaches a substantially stable state. At low temperature, the last selected liquid crystal element exhibits a characteristic somewhat delayed in time (see the curve 43) compared with the characteristic at normal temperature and, at high temperature, it exhibits a characteristic somewhat advanced in time (see the curve 45) compared with the characteristic at normal temperature.

As earlier noted, if the light source is flashed after the entire liquid crystal display has stabilized (over the entire operating temperature range of the liquid crystal display), there arises the problem that the light-emission period becomes extremely short and the brightness of the liquid crystal display decreases.

Here, one possible method to increase the brightness of the liquid crystal display is to lengthen the light-emission period twi, for example, by setting the writing period twr in FIG. 15 approximately equal to t1 in FIG. 16 and the response wait time twa in FIG. 15 approximately equal to t2 in FIG. 16. Then, the rise timing of the light-emission period twi occurs at time t1+t2 in FIG. 16. By this time, the transmittance rate of the first selected liquid crystal element has reached a substantially stable state (see the curves 40, 42, and 44), but the transmittance rate of the last selected liquid crystal element has reached only ½ of its stable state (see the curves 41, 43, and 45).

As a result, if it is attempted to adjust the color balance by changing the rise timing of the light-emission period twi in the vicinity of the time t1+t2 (i.e., by adjusting the length of the light-emission period for each color), there is an appreciable difference between the transmittance rate state of the first selected liquid crystal element and the transmittance rate state of the last selected liquid crystal element. That is, it is extremely difficult to achieve the color balance over the entire liquid crystal display screen.

Furthermore, if the color balance of the liquid crystal display is adjusted prior to shipment from the factory, there arises the problem that the color balance is deteriorated due to changes in temperature in the operating environment, because the transmittance characteristics of the liquid crystal elements greatly depend on the temperature (see FIG. 16).

In the case of fast-response liquid crystals such as ferroelectric or antiferroelectric liquid crystals, the response wait period twa shown in FIG. 15 is not provided or is set extremely short, and the light-emission period twi is lengthened, to increase the brightness of the liquid crystal display. Here also, there arises not only the problem that, if it is attempted to adjust the color balance by changing the rise timing of the light-emission period twi, it is extremely difficult to achieve the color balance but also the problem that the color balance is deteriorated due to changes in temperature in the operating environment.

In the patent document 2, it is pointed out that even when the light source for the preceding subfield is ON, the writing of display data for the next color can be started without any problem as long as the writing is started within the period during which the liquid crystal does not respond.

Patent document 1: Japanese Unexamined Patent Publication No. H09-274471

Patent document 2: Japanese Unexamined Patent Publication No. 2000-214435

SUMMARY OF THE INVENTION

One problem that the invention aims to solve is that when adjusting the color balance of an FSC display apparatus by changing the light source flashing period in the subfield for each color, it is extremely difficult to achieve the color balance even if the rise timing of the light-emission period is changed. Another problem is that if the rise timing of the light-emission period is changed, the color balance is deteriorated due to changes in temperature in the operating environment.

It is an object of the present invention to provide an FSC display apparatus that can easily achieve color balance.

It is another object of the present invention to provide an FSC display apparatus that can maintain color balance stably irrespective of changes in temperature in the operating environment.

A display apparatus according to the present invention, which includes a light source for emitting a plurality of colored lights in sequence and in a repetitive manner and a display section for controlling transmission or reflection of the lights emitted from the light source, produces a color display by dividing each field into a plurality of subfields and by causing a designated one of the plurality of colored lights to be emitted at least during a part of a period within the plurality of subfields thereby displaying on the display section an image corresponding to the designated colored light, wherein each of the subfields includes at least a data writting period for writting display data to the display section and a light-emission period for emitting the designated colored light, and the end timing of the light-emission period can be set in a variable manner.

Preferably, in the display apparatus according to the present invention, the subfield begins with the data writting period and ends at the light-emission period.

Preferably, the display apparatus according to the present invention further includes a control input terminal to which a control input signal for setting the end timing of the light-emission period is applied.

Preferably, in the display apparatus according to the present invention, the subfield begins with the data writing period wherein, when the end timing of the light-emission period is set by the control input signal so as to provide the shortest light-emission period, the light-emission period ends within the subfield period, but when the end timing of the light-emission period is set by the control input signal so as to provide the longest light-emission period, the light-emission period ends within the next subfield period.

Preferably, in the display apparatus according to the present invention, the control input signal sets the end timing of the light-emission period for each of the plurality of colored lights.

Preferably, in the display apparatus according to the present invention, the number of control bits of the control input signal for at least one of the plurality of colored lights is different from the number of control bits for the other ones of the plurality of colored lights.

Preferably, the display apparatus according to the present invention further includes a flexible printed circuit board for writing the display data to the display section, light-emitting diodes for outputting the colored lights, and a driver IC for driving the light-emitting diodes, wherein the light-emitting diodes, the driver IC, and the control input terminal are mounted on the flexible printed circuit board.

A display apparatus according to the present invention, which includes a light source for emitting a plurality of colored lights and a display section for controlling transmission or reflection of the lights emitted from the light source, produces a color display by driving the display section in corresponding relationship to one colored light selected from among the plurality of colored lights and by repeating for each color a step for causing the light source to emit the one colored light, wherein the end timing of a light-emission period for causing the light source to emit the one colored light can be set in a variable manner.

A display apparatus according to the present invention includes a light source for emitting a plurality of colored lights, a display section for controlling transmission or reflection of the lights emitted from the light source, a light source driving section for driving the light source, and a display driving section for driving the display section, wherein the display driving section drives the display section in corresponding relationship to one colored light selected from among the plurality of colored lights, and the light source driving section drives the light source by repeating for each color a step for causing the light source to emit the one colored light, thereby producing a color display, and the end timing of a light-emission period for causing the light source to emit the one colored light can be set in a variable manner by the light source driving section.

A color balance correction method according to the present invention includes the steps of driving the display section in corresponding relationship to one colored light selected from among the plurality of colored lights, and a step for causing the light source to emit the one colored light is repeated for each color, and correcting color balance between the plurality of colored lights so that the end timing of the light-emission period for causing the light source to emit the one colored light is set in a variable manner.

A display apparatus according to the present invention includes a light source for emitting a plurality of colored lights, a display section for controlling transmission or reflection of the lights emitted from the light source, a light source driving section for driving the light source, a display driving section for driving the display section, and a setting section for setting timing for a light-emission period during which the light source driving section drives the light source to emit one colored light selected from among the plurality of colored lights.

Preferably, the display apparatus according to the present invention further includes a flexible board for connecting the display section, the light source driving section, and the display driving section, wherein the setting section is mounted on the flexible board.

Preferably, in the display apparatus according to the present invention, the setting section outputs a control input signal for setting the timing for the light-emission period.

Preferably, in the display apparatus according to the present invention, the number of control bits of the control input signal for at least one of the plurality of colored lights is different from the number of control bits for the other ones of the plurality of colored lights.

Preferably, in the display apparatus according to the present invention, the light source driving section and the display driving section are integrated into one IC.

Preferably, in the display apparatus according to the present invention, the IC is mounted on the display section.

A display apparatus according to the present invention displays one image field on a liquid crystal panel in a subfield period having a writting period and an illuminating device flashing period (first prescribed period) that follows the writting period, wherein the subfield period is repeated cyclically, and wherein a prescribed period is provided between the end timing of the flashing period of one subfield and the start timing of the writing period of another subfield that follows the one subfield.

Further, a display apparatus according to the present invention displays one image field on a liquid crystal panel in a subfield period having a writing period and an illuminating device flashing period (second prescribed period) that follows the writing period, wherein the subfield period is repeated cyclically, and wherein the end timing of the flashing period of one subfield arranges in the writing period of another subfield that follows the one subfield.

Preferably in the display apparatus according to the present invention, the first or second prescribed period is variable.

Preferably in the display apparatus according to the present invention, the second prescribed period is set so as to end before a liquid crystal response characteristic rises to exhibit a transmittance rate greater than 80% in that other subfield that follows the one subfield.

According to the present invention, color balance can be easily achieved in the (FSC) display apparatus. Further, according to the present invention, in the FSC display apparatus, color balance can be maintained stably irrespective of changes in temperature in the operating environment.

DETAILED DESCRIPTION OF THE PREFERRED EMBODIMENT

A display apparatus according to the present invention will be described below with reference to the drawings.

Figure 13:
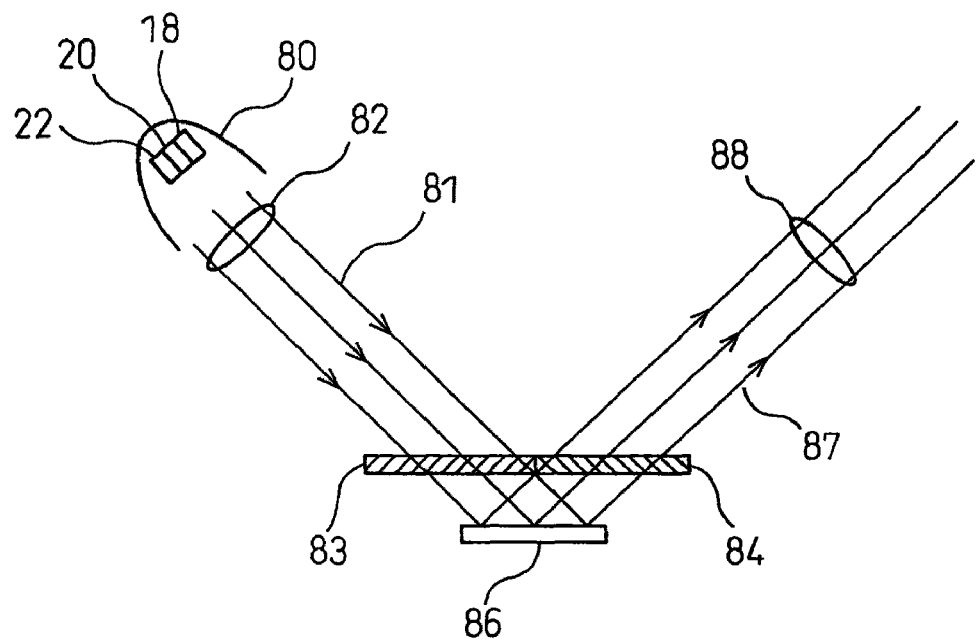
FIG. 13 is a diagram showing one example of a reflective liquid crystal display apparatus.
Figure 14:
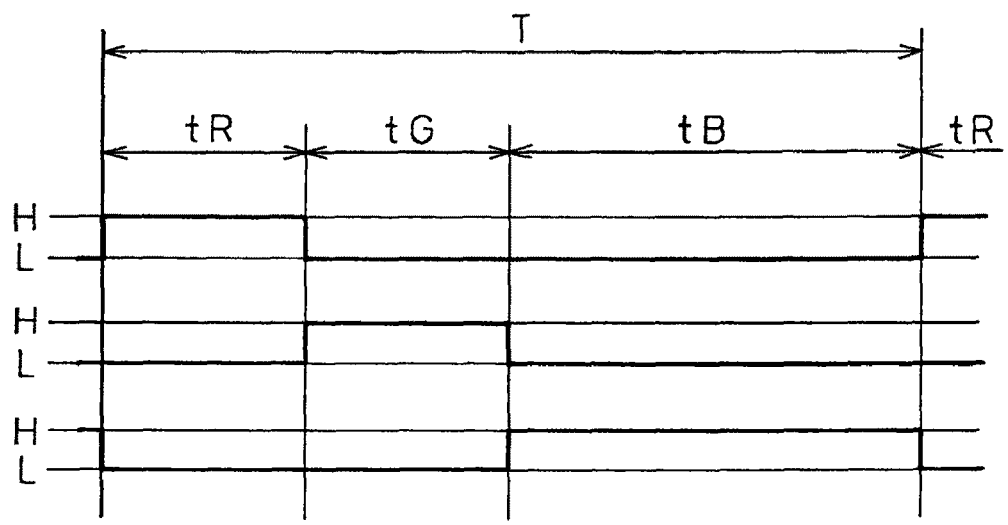
FIG. 14 is a diagram for explaining a prior art technique for achieving color balance.
Figure 15:
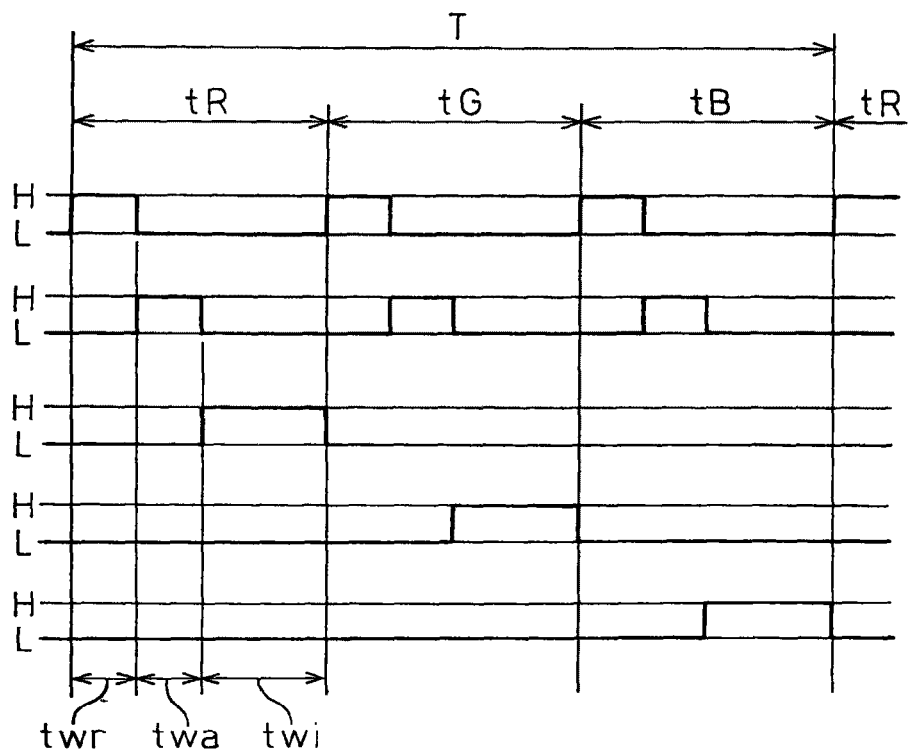
FIG. 15 is a diagram for explaining a prior art technique for avoiding color mixing.

The following description will be given by taking as an example a display apparatus that uses a transmissive liquid crystal panel, but it will be recognized that the present invention is also applicable to an FSC liquid crystal color display that uses a reflective liquid crystal panel such as shown in FIG. 13, in which case also the same effect as achieved in the present invention can be obtained.

Figure 6:
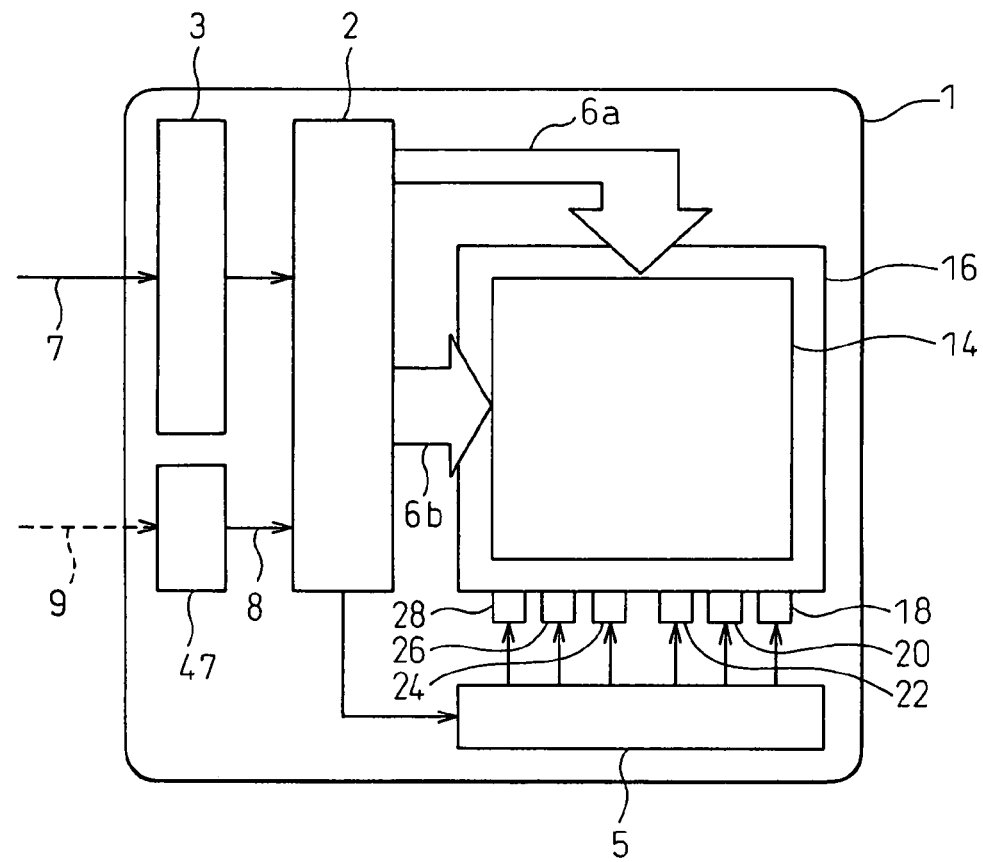
FIG. 6 is a diagram showing in simplified form the configuration of the display apparatus according to the present invention.

FIG. 6 is a diagram showing in simplified form the configuration of a display apparatus 1 according to the present invention.

The display apparatus 1 comprises a control section 2 which includes a CPU, etc., an IF (interface) section 3, a control input section (external terminals) 47, an LED driving section 5, a liquid crystal display section 14, and a light-guide plate 16.

The control section 2 receives externally applied display data 7 via the IF section 3, and supplies a signal 6a to a plurality of signal electrodes and a scanning signal 6b to a plurality of scanning electrodes in the liquid crystal display section 14 to drive liquid crystal pixels in accordance with the display data. Further, the control section 2 controls the LED driving section 5 to activate LEDs 18 to 28 at prescribed timings, as will be described later. Further, the display apparatus is constructed so that the flash timing of each LED can be set in a variable manner by a control input signal 8 supplied from the control input section 47.

Figure 2:
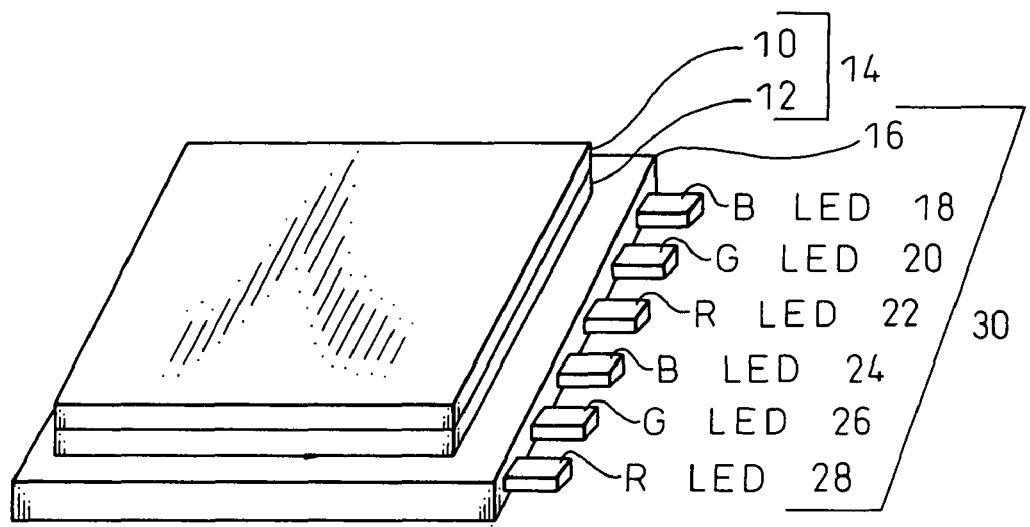
FIG. 2 is a perspective view of a liquid crystal display section.

FIG. 2 is a perspective view of the liquid crystal display section and its associate parts.

As shown in FIG. 2, the liquid crystal display section 14 comprises an upper substrate 10 and a lower substrate 12 each formed from a glass or plastic material, and a liquid crystal material provided between the upper and lower substrates 10 and 12. The light-guide plate 16 mounted behind the liquid crystal display section 14 and the light-emitting devices (red light-emitting diodes (red LEDs) 22 and 28, green light-emitting diodes (green LEDs) 20 and 26, and blue light-emitting diodes (blue LEDs) 18 and 24) mounted on one side face of the light-guide plate 16 together make up a light source 30. In the display apparatus 1, the light source 30 emits the red, green, and blue colored lights in sequence and in a repetitive manner, and the liquid crystal display section 14 controls the transmission of each colored light emitted from the light source 30. In this way, the display apparatus 1 functions as an FSC liquid crystal display apparatus.

Throughout the drawings given hereinafter, same or similar elements, as described above, are designated by the same reference numerals.

Figure 3:
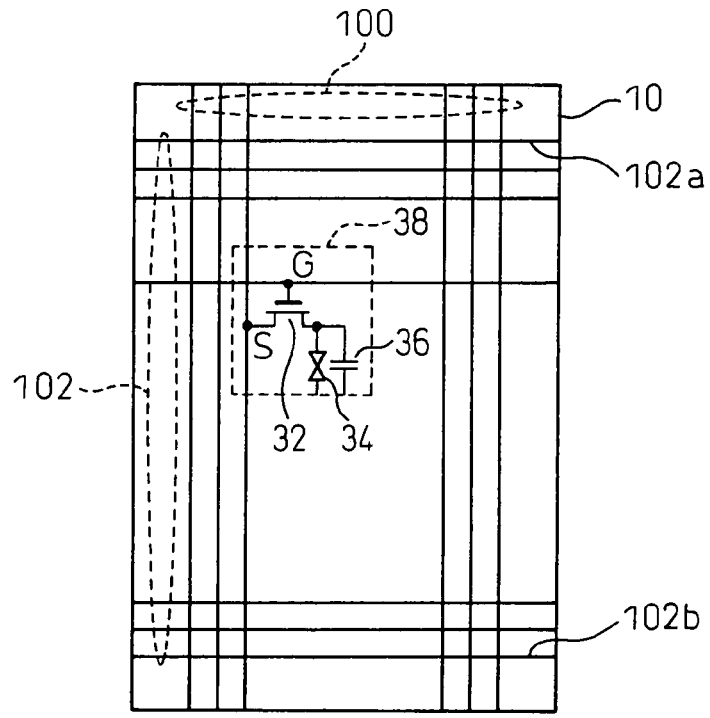
FIG. 3 is a diagram for explaining the operation of the liquid crystal display section in FIG. 2.

FIG. 3 is a diagram for explaining the operation of the liquid crystal display section 14 that functions as an active-matrix liquid crystal panel.

In FIG. 3, reference numeral 38 indicates a pixel formed on the upper substrate 10. As shown in FIG. 3, a transistor 32 and a capacitor 36 are provided for each pixel 38, and the node between the transistor 32 and the capacitor 36 is connected to an electrode of a liquid crystal pixel 34. The gate electrode G of the transistor 32 is connected to one of the scanning electrodes in the display scanning electrode array 102. When the transistor 32 is selected by the sequential scanning of the scanning electrodes, the selected transistor 32 conducts, and the display data applied to the signal electrode in the signal electrode array 100 that is connected to the source electrode S is stored into the capacitor 36. The liquid crystal pixel 34 is driven in accordance with the voltage stored in the capacitor 36.

Like the pixel 38 shown in FIG. 3, each of the plurality of pixels forming the liquid crystal display section 14 comprises a transistor, a liquid crystal pixel, and a capacitor. The gate electrodes of the respective transistors in the plurality of pixels forming a given row on the liquid crystal display section 14 are connected in common to a given scanning electrode in the display scanning electrode array 102. Further, the plurality of pixels in a given row connected to a given scanning electrode in the display scanning electrode array 102 are connected to respectively different signal electrodes in the signal electrode array 100. In each of the plurality of pixels in a given row, the display data is stored into the capacitor by the action of the transistor in that pixel, and the liquid crystal pixel is driven in accordance with the display data stored in the capacitor. In each pixel, the display data is retained for a predetermined period by the action of the capacitor. That is, when data are written to the respective pixels forming the liquid crystal display section 14, the resulting display state can be retained at least for a given length of time.

When the scanning of the scanning signal lines in the display scanning signal line array 102 proceeds from the top to the bottom in the figure, the liquid crystal pixels in the row connected to the display scanning electrode 102a correspond to the "first selected portion of the liquid crystal display" previously explained with reference to FIG. 16, and the liquid crystal pixels in the row connected to the display scanning electrode 102b correspond to the "last selected portion of the liquid crystal display" previously explained with reference to FIG. 16.

In the example of FIGS. 2 and 3, the display scanning electrode array 102 and the signal electrode array 100 are formed principally on the upper substrate 10, but they may be formed either on the upper substrate 10 or on the lower substrate 12.

Figure 1:
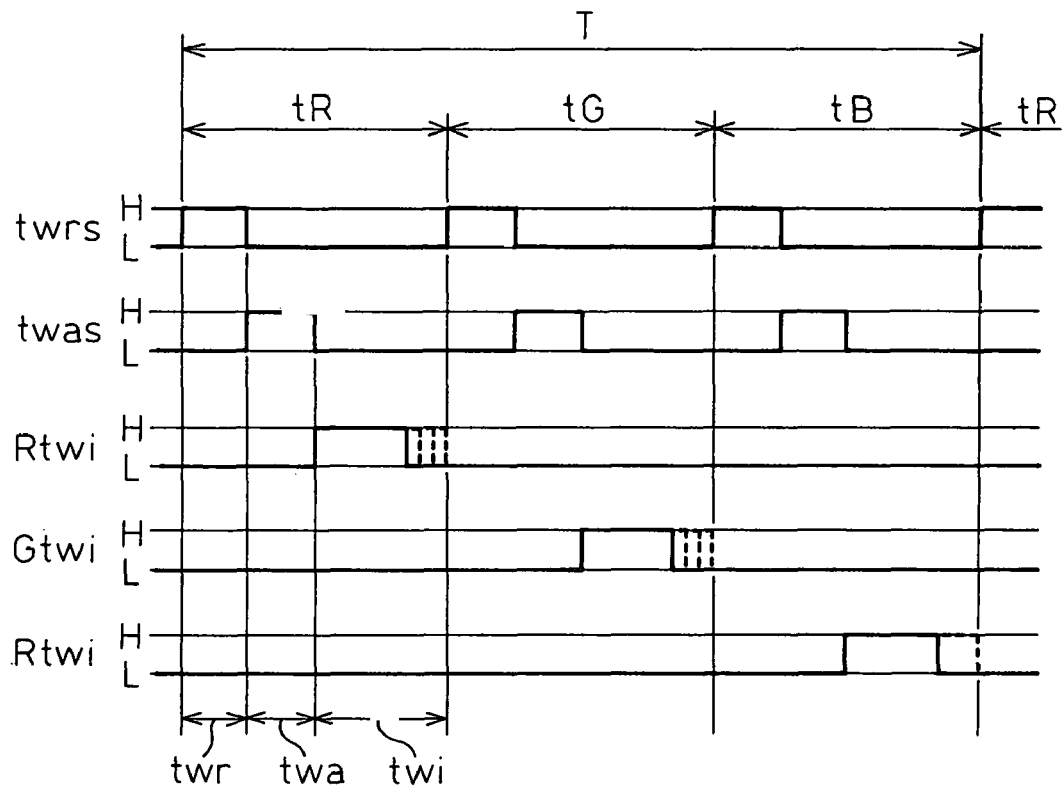
FIG. 1 is a diagram showing one example of a timing chart for a display apparatus according to the present invention.

FIG. 1 is a diagram showing one example of a timing chart for driving the display apparatus 1 according to the present invention.

In FIG. 1, one field period T is divided into three subfields, an R-subfield tR, a G-subfield tG, and a B-subfield tB. Each subfield begins in synchronism with the rising of the writting period signal twrs, i.e., the timing for writing the display data of a given color to be displayed on the liquid crystal display section 14. In the FSC liquid crystal color display apparatus, one field is the period for displaying a given pixel in a desired color by driving the liquid crystal display section 14 in a time-division fashion by flashing the red, green, and blue LEDs in sequence.

Each subfield is further divided into a writing period twr in which the writing period signal twrs is high, a response wait period twa in which the response wait period signal twas is high, and a light-emission period twi that follows the response wait period twa. In the R-subfield, the red (R) light source is flashed for the duration of the light-emission period twi (R light-emission period), and in the G-subfield, the green (G) light source is flashed for the duration of the light-emission period twi (G light-emission period), and in the B-subfield, the blue (B) light source is flashed for the duration of the light-emission period twi (B light-emission period).

Here, the flashing of the red LEDs is controlled by a red-LED flash signal Rtwi, the flashing of the green LEDs is controlled by a green-LED flash signal Gtwi, and the flashing of the blue LEDs is controlled by a blue-LED flash signal Btwi. The red-LED flash signal Rtwi, the green-LED flash signal Gtwi, and the blue-LED flash signal Btwi are supplied from the LED driving section 5.

The timing shown in the timing chart of FIG. 1 is characterized by the way the light-emission period of the light source for each color is ended. More specifically, the end timing (the fall timing shown by a solid line or dotted line) of the light-emission period of each color is made variable, as shown in FIG. 1.

The end timing of the light-emission period of each color is thus made variable in order to adjust the color balance. That is, the color balance is adjusted by fine-adjusting the light-emission period of each color. The end timing of the light-emission period of each color is determined at the time of the color balance adjustment.

As shown in FIG. 1, for the red color (R) and green color (G), four different end timings are selectable for the light-emission period, while, for the blue color (B), two different end timings are selectable for the light-emission period.

Figure 4:
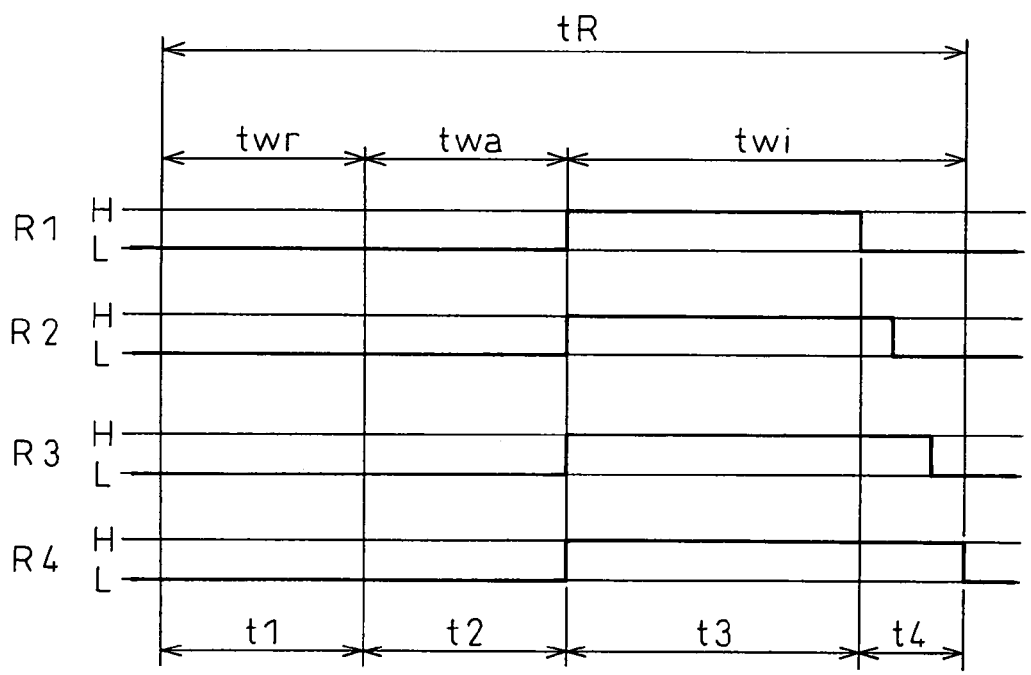
FIG. 4 is a diagram showing an example of end timing for an R-color light-emission period in FIG. 1.
Figure 5:
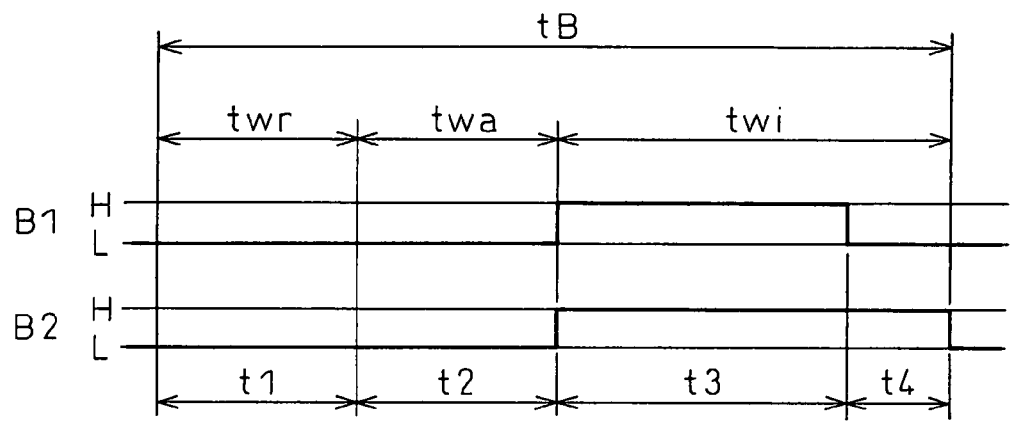
FIG. 5 is a diagram showing an example of end timing for a B-color light-emission period in FIG. 1.

FIG. 4 shows the end timings selectable for the light-emission period in the R-subfield tR in FIG. 1, and FIG. 5 is a diagram showing the end timings selectable for the light-emission period in the B-subfield tB in FIG. 1.

The end timings selectable for the light-emission period in the G-subfield tG are the same as those shown in FIG. 4 for the R-subfield tR.

As shown in FIG. 4, four timings, R1, R2, R3, and R4, are selectable as the end timing for the light-emission period in the R-subfield tR. In any one of the timing waveforms R1 to R4, the light source starts flashing as the signal rises at the beginning of the light-emission period twi, and stops flashing as the signal falls in the period t4. Even in the case of R4 which provides the longest light-emission period, the flashing ends within the light-emission period twi and the light-emission period does not overlap into the next subfield in which the writing of data for the next color begins.

Which one of the timings R1 to R4 is to be selected is determined by the prescribed control input signal 8, etc. supplied from the control input section 47 provided to adjust the color balance of the display apparatus 1.

As shown in FIG. 5, two timings, B1 and B2, are selectable as the end timing for the light-emission period in the B-subfield tB. In both B1 and B2, the light source starts flashing as the signal rises at the beginning of the light-emission period twi, and stops flashing as the signal falls in the period t4. Even in the case of B2 which provides the longer light-emission period, the flashing ends within the light-emission period twi and the light-emission period does not overlap into the next subfield in which the writing of data for the next color begins.

Which timing, B1 or B2, is to be selected is determined by the prescribed control input signal 8, etc. supplied from the control input section 47 provided to adjust the color balance of the display apparatus 1.

In this way, four end timings are selectable for the light-emission period for each of the red and green colors, and two end timings for the blue color. Accordingly, for the adjustment of the color balance, an optimum state can be selected from among 4×4×2=32 possible combinations.

In FIGS. 4 and 5, all the end timings selectable for the light-emission period in each subfield are set within the period t4 in which the transmittance rate of the liquid crystal is stable. In the period t4, both the first selected liquid crystal element and the last selected liquid crystal element exhibit substantially stable transmittance rate, are in substantially the same state, and are relatively stable to variations in temperature. The effect of this is that the initial color balance adjustment can be made relatively easily and that the color balance, once set, is not easily deteriorated even when the temperature changes in the operating environment.

In the example shown in FIGS. 1, 4, and 5, two end timings have been made selectable for the light-emission period of the blue color (B), but instead, four end timings may be made selectable for the light-emission period of the blue color, while reducing the number of selectable end timings to two for the red color (R) or green color (G). Further, the end timing of the light-emission period and the number of selectable end timings may be set optimally for each color.

Figure 7:
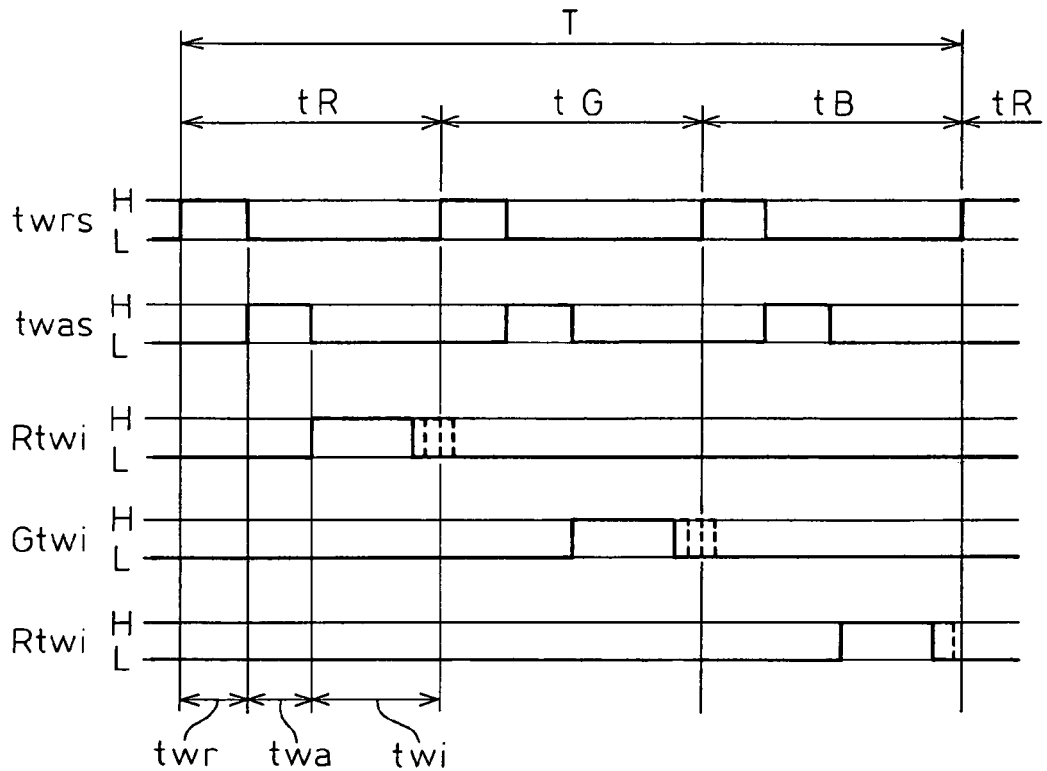
FIG. 7 is a diagram showing another example of the timing chart for the display apparatus according to the present invention.

FIG. 7 is a diagram showing another example of the timing chart for driving the display apparatus 1 according to the present invention.

In FIG. 7 also, one field period T is divided into three subfields, the R-subfield tR, the G-subfield tG, and the B-subfield tB. Each subfield begins in synchronism with the rising of the writing period signal, i.e., the timing for writing the display data of a given color to be displayed on the liquid crystal display section 14.

Each subfield is further divided into a writing period twr in which the writing period signal twrs is high, a response wait period twa in which the response wait period signal twas is high, and a light-emission period twi that follows the response wait period twa. In the R-subfield, the red (R) light source is flashed mainly in the light-emission period twi (R light-emission period), and in the G-subfield, the green (G) light source is flashed mainly in the light-emission period twi (G light-emission period), and in the B-subfield, the blue (B) light source is flashed mainly in the light-emission period twi (B light-emission period).

In the light-emission period of each color, the end timing is made variable so that the flashing ends in synchronism with the fall timing indicated by a solid line or dotted line.

The end timing is thus made variable in order to adjust the color balance. That is, the color balance is adjusted by fine-adjusting the end timing of the light-emission period of each color. The end timing is determined at the time of the color balance adjustment.

As shown in FIG. 7, for the red color (R) and green color (G), four different end timings are selectable for the light-emission period, while, for the blue color (B), two different end timings are selectable for the light-emission period.

As described above, the timing chart of FIG. 7 is similar to that of FIG. 1, but somewhat differs in the way the end timing of the light-emission period of the light source is set. That is, in the timing chart of FIG. 1, even when the light-emission period is set long, the flashing ends within the light-emission period twi and the light-emission period does not overlap into the next subfield in which the writing of data for the next color begins. On the other hand, in the timing chart of FIG. 7, when the end timing of the light-emission period of the light source is set by the control input signal so as to provide a short light-emission period, the light-emission period ends within the current subfield period, but when it is set by the control input signal so as to provide the longest light-emission period, the light-emission period ends within the next subfield period.

Figure 8:
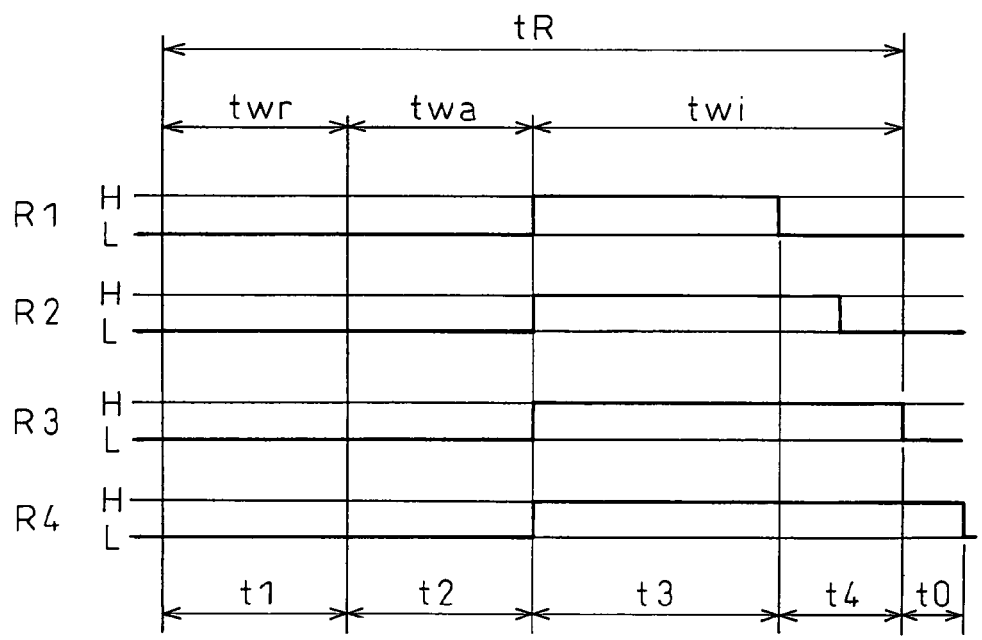
FIG. 8 is a diagram showing an example of end timing for the R-color light-emission period in FIG. 7.
Figure 9:
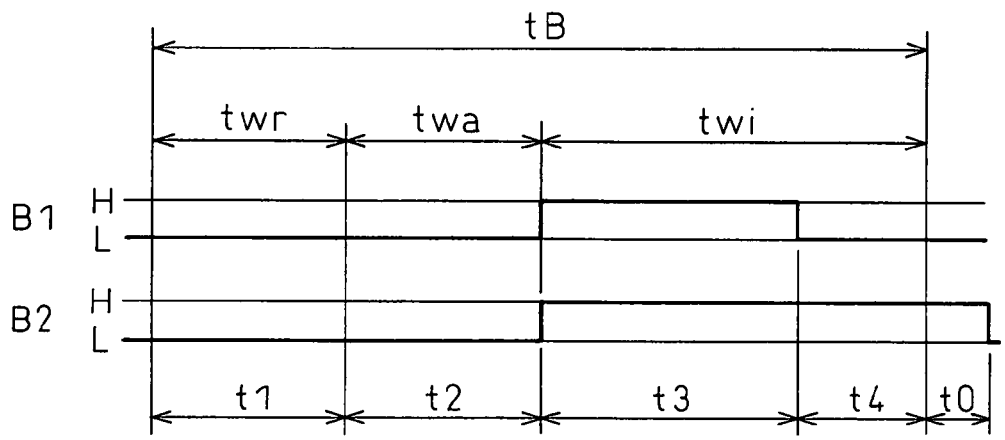
FIG. 9 is a diagram showing an example of end timing for the B-color light-emission period in FIG. 7.

FIG. 8 shows the end timings selectable for the light-emission period in the R-subfield tR in FIG. 7, and FIG. 9 is a diagram showing the end timings selectable for the light-emission period in the B-subfield tB in FIG. 7.

The end timings selectable for the light-emission period in the G-subfield tG are the same as those shown in FIG. 8 for the R-subfield tR.

In FIG. 8, the end timing of the R light-emission period is determined by the control input section 47 provided to adjust the color balance, and can be selected from among the four states shown, i.e., R1, R2, R3, or R4. In each of the waveforms R1 to R4, the signal rises in synchronism with the beginning of the light-emission period twi, and the light source starts flashing. In R1 to R3 in which the period is set relatively short, the flashing ends within the R-subfield. However, in R4 in which the period is set the longest by the control input signal 8, the flashing does not end within that subfield period but continues into the next subfield period by a period t0.

In FIG. 9, the end timing of the B light-emission period is determined by the control input section 47 provided to adjust the color balance, and can be selected from among the two states shown, i.e., B1 and B2. In both B1 and B2, the signal rises in synchronism with the beginning of the light-emission period twi, and the light source starts flashing. In B1 in which the period is set relatively short, the flashing ends within the B-subfield. However, in B2 in which the period is set longer by the control input signal 8, the flashing does not end within that subfield period but continues into the next subfield period by a period t0.

In this way, four end timings are selectable for the light-emission period for each of the red and green colors, and two end timings for the blue color. Accordingly, for the adjustment of the color balance, an optimum state can be selected from among 4×4×=32 possible combinations.

In FIGS. 8 and 9, all the end timings selectable for the light-emission period in each subfield are set within the period t4 in which the transmittance rate of the liquid crystal is stable. In the period t4, both the first selected liquid crystal element and the last selected liquid crystal element exhibit substantially stable transmittance rate, are in substantially the same state, and are relatively stable to variations in temperature. The effect of this is that the initial color balance adjustment can be made relatively easily and that the color balance, once set, is not easily deteriorated even when the temperature changes in the operating environment.

Figure 16:
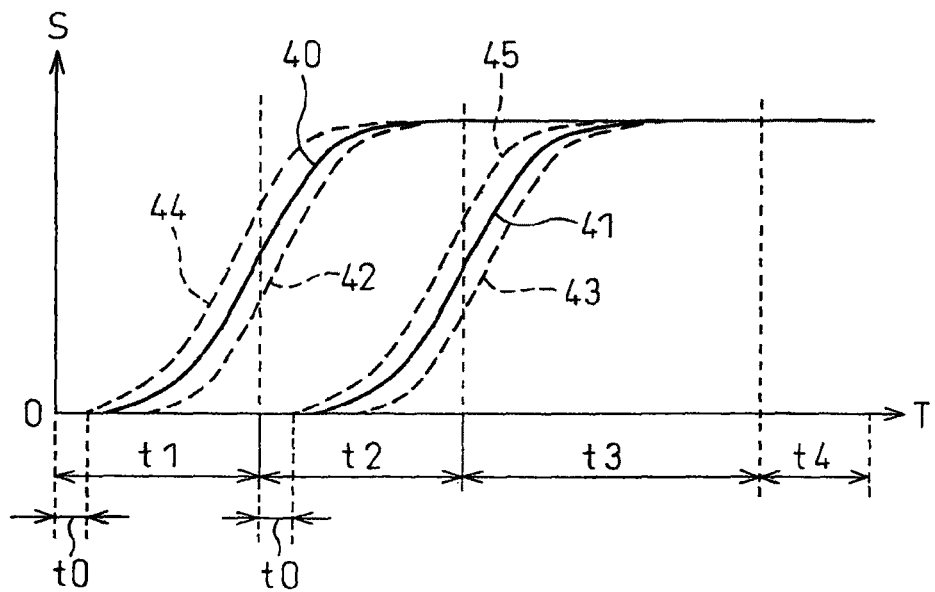
FIG. 16 is a diagram showing the transient response of the transmittance rate of a liquid crystal.

Further, the period t0 in FIGS. 8 and 9 is contained in the period t1 shown in FIG. 16, i.e., the period in which the writing of data in the next subfield is started but the liquid crystal has yet to start responding. Accordingly, if the flashing of the light source continues into the period t0, color mixing does not occur.

FIGS. 8 and 9 have shown the example in which the flashing continues into the next subfield but not past the period t0 in which the liquid crystal display section 14 has yet to start responding, but it will be appreciated that the light-emission period can be further extended to increase the brightness of the display screen by making the flashing continue beyond the period t0 to an extent that does not cause a practical problem.

If the display screen cannot be made sufficiently bright by adjusting the end timing alone (if increasing the brightness of the display screen is the main purpose), the start timing of the light-emission period may be advanced into the period t2 in FIGS. 8 and 9. As described in FIG. 16, the transmittance rate of the liquid crystal element is not yet stabilized in the period t2, but no appreciable problem will occur if the light-emission periods of all the colors are extended into the period t2 in the same manner.

Further, not only the end timing of the light-emission period of the light source but also the rise timing thereof may be set in a variable manner. In that case, the adjustable range of the light-emission period increases and, by optimizing the display, it may become possible to further enhance the display quality.

In this way, the example shown in FIGS. 7, 8, and 9 offers the effect that not only can the initial color balance adjustment be made relatively easily but, even when the temperature changes in the operating environment, the change in the amount of adjustment is small and the color balance is not easily deteriorated. The example shown in FIGS. 7, 8, and 9 offers the further effect that the light-emission period of the light source can be made longer within one field and, as a result, the brightness of the display screen can be increased.

In the examples of FIGS. 1 and 7, a total of 4×4×2=32 possible combinations have been made available for the selection of the end timings of the light-emission periods, but the invention is not limited to this particular arrangement, and the effect of the invention can be obtained if the number of selections is made smaller or larger.

Figure 10:
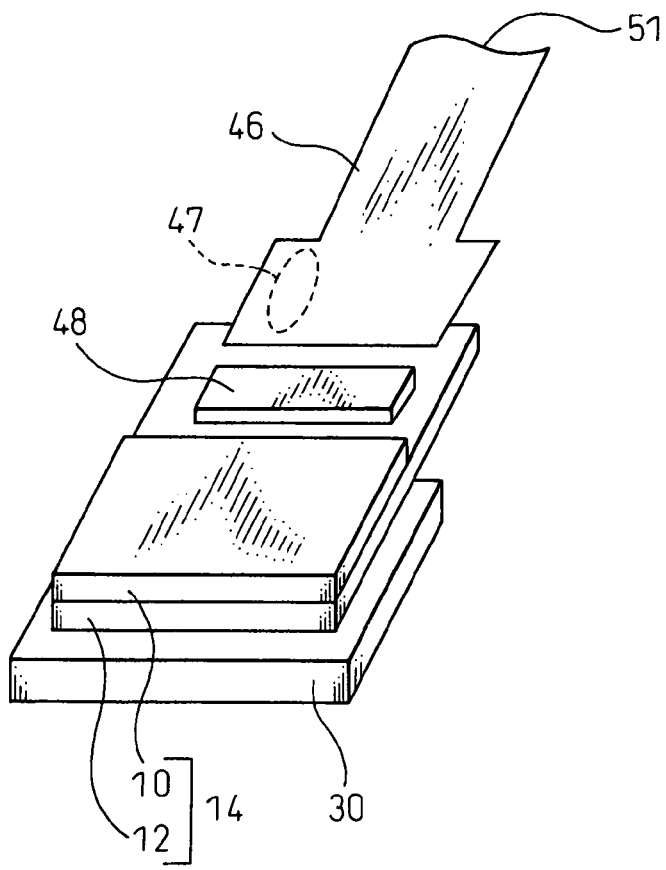
FIG. 10 is a diagram for explaining one configuration example of the display apparatus according to the present invention.

FIG. 10 is a diagram for explaining one configuration example of the display apparatus 1 according to the present invention.

As shown in FIG. 10, the light source 30 is mounted behind the liquid crystal display section 14 which comprises the upper substrate 10 and lower substrate 12 as earlier described, and a liquid crystal driver IC 48 is mounted on the lower substrate 12 using a technique known as COG. The liquid crystal driver IC 48 contains at least the control section 2, the IF 3, and the LED driving section 5. A flexible printed circuit board (hereinafter abbreviated FPC) 46 is connected to the lower substrate 12, and the control input section 47 is mounted on the FPC 46. The portion 51 of the FPC 46 is connected to the system main unit, and receives the display data to be supplied to the liquid crystal display section 14 and also receives various signals for activating the light-emitting diode array 52.

The control input section 47 is a circuit for generating the control input signal 8, and is configured so that its setting can be changed while checking the overall color balance of the liquid crystal display section 14. The setting of the control input section 47 is made at the factory at the final stage of the fabrication of the display apparatus 1. Accordingly, the adjustment can be made for every variation that can occur. Furthermore, since the control input section 47 is integrated on the FPC 46, a display apparatus that is compact in size, and whose color balance is easily adjustable, can be achieved.

Figure 11:
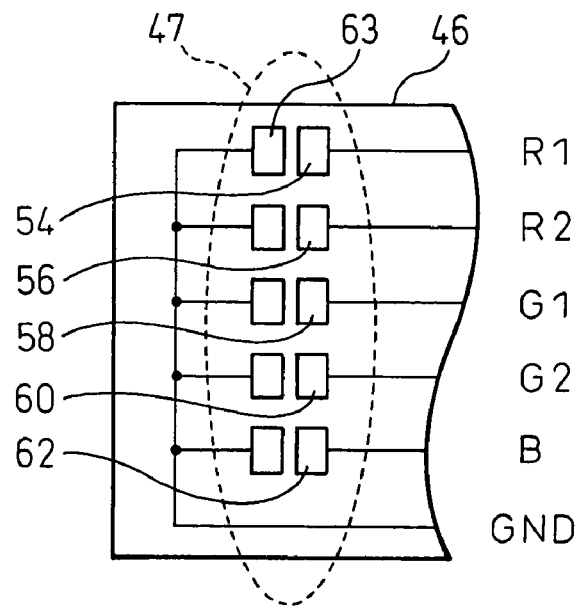
FIG. 11 is a diagram showing one example of a control input section.

FIG. 11 is a diagram showing one configuration example of the control input section 47 mounted on the FPC 46.

As shown in FIG. 11, there are mounted control input terminals 54 and 56 for two bits for the red color (R1 and R2), control input terminals 58 and 60 for two bits for the green color (G1 and G2), and a control input terminal 62 for one bit for the blue color (B). These control input terminals 54 to 62 are pulled up, for example, to Vdd potential. A total of six GND terminals 63, which are mounted adjacent to the respective control input terminals, are selectively connecting or not connecting each input terminal to a corresponding one of the GND terminals by soldering or the like, and therefore the voltage to be applied is changed to generate the prescribed control input signal 8.

With the provision of the control input section 47 of the above bit count, four light-emission period end timings are available for selection for each of the red and green colors, and two end timings for the blue color. For example, when both the control input terminals 54 (R1) and 56 (R2) are connected to GND, the end timing of the light-emission period of the red color is set to R1 in FIGS. 4 and 8. When only the control input terminal 56 (R2) is connected to GND, the end timing is set to R2. When only the control input terminal 54 (R1) is connected to GND, the end timing is set to R3. When neither of the control input terminals 54 (R1) nor 56 (R2) is connected to GND, the end timing is set to R4. In this way, the end timing of the light-emission period of each color is selected by the control input signal 8 generated by the control input section 47.

The number of control bits for at least one color of the control input section 47 is different from the other colors, for example, one bit for the blue color and two bits for each of the red and green colors. That is, the number of control bits is determined by considering the sensitivity of the human eye. In this way, by setting the number of control bits differently, the color balance adjustment can be achieved efficiently with a small number of control bits.

Further, depending on variations in brightness among the respective color LEDs, the number of control bits may be reduced, not for the blue color, but for some other color. More specifically, the number of control bits may be made equal for all colors, or the number of control bits may be varied by considering the variation among the respective color LEDs. For example, by assigning a larger number of bits to an LED having a larger variation, the color balance adjustment can be achieved efficiently with a smaller number of bits.

Here, the control input signal may be generated by setting an external terminal 9 (see FIG. 6) using the control input terminals 54 to 62.

Figure 12:
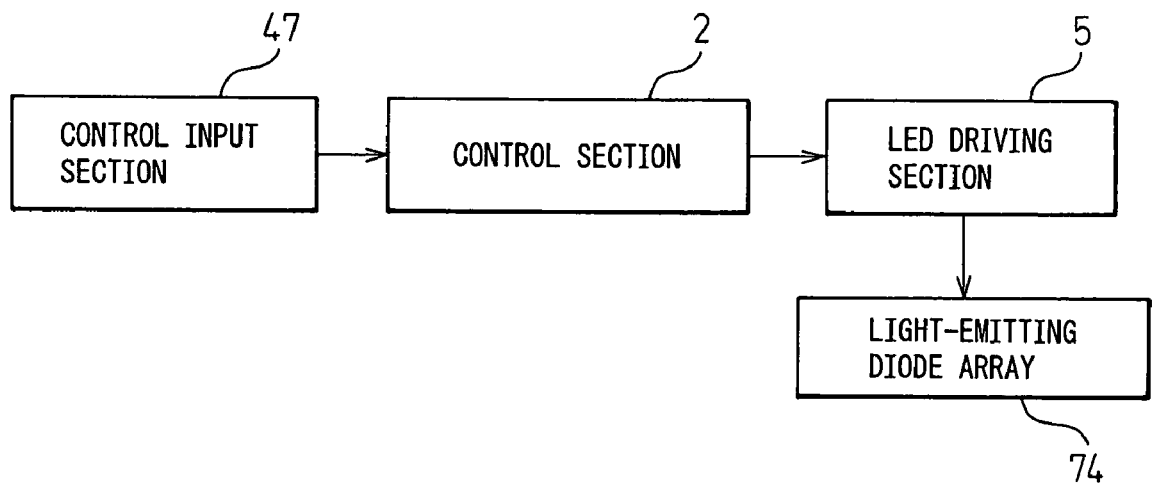
FIG. 12 is a block diagram showing control of the light-emission period of a light-emitting diode array by the control input section.

FIG. 12 is a block diagram showing a flow of how the light-emission period of the light-emitting diode array is controlled by the control input section 47.

In FIG. 12, the above-described connection state of the control input section 47 is passed to the control section 2 that functions as a light-emission period control circuit, and the control section 2 selects the fall timing of the light-emission period. Then, in accordance with the selected timing, the LED driving section 5 drives the light-emitting diode array 74 made up of the light-emitting diodes 18 to 28 shown in FIG. 2.

FIG. 11 has shown a method in which the terminals of the control input section 47 are connected by soldering. Alternatively, use may be made of a nonvolatile memory built into a control IC, and data corresponding to the control input signal 8 may be written to the memory. Here, the data corresponding to the control input signal 8 may be written to the memory from the CPU that controls the driving of the display apparatus 1. Further alternatively, the control input signal 8 may be transmitted to the display apparatus 1 from the CPU that controls the driving of the display apparatus 1.

The above description has been given by dealing with an example that uses an active-type liquid crystal display apparatus. However, the invention is also applicable to a liquid crystal display apparatus having a memory capability, for example, a passive-type liquid crystal display apparatus such as a ferroelectric or antiferroelectric liquid crystal display apparatus.

As earlier described, the present invention can also be applied to a reflective-mode FSC liquid crystal display apparatus, in which case also the same effect as described above can be achieved. The reflective-mode FSC liquid crystal display apparatus, to which the present invention can be applied, will be described below.

FIG. 13 is a diagram for explaining the reflective-mode FSC liquid crystal display apparatus.

In recent years, high-definition reflective liquid crystal display panels have been attracting attention as liquid crystal display panels.

This type of liquid crystal display panel is constructed using a technology known as LCOS (LC on Silicon) in which a liquid crystal layer is deposited over reflective pixel electrodes formed on a silicon substrate, and an image is produced for display by modulating the plane of polarization of incident light in accordance with the display state of each pixel and by reflecting the thus modulated light.

Various kinds of image display apparatus using such reflective liquid crystal display panels have been proposed. Examples include a direct-view type in which an illuminating light beam from an illumination source is reflected and the reflected light is viewed through a lens, and a projection type in which an illuminating light beam is reflected and the reflected light is enlarged through a lens for projection onto a screen for viewing.

The optical systems for these reflective image display apparatus are classified into two types according to how the illuminating light beam and the image light beam (projection light beam) are handled. One is the optical system of the type that separates the illuminating light beam and the image light beam by using a polarization beam splitter. In this type, the optical system can be constructed with components arranged on a common axis, but the size and cost of the apparatus increase because the number of optical elements increases.

The other is the optical system of the type in which the number of optical elements is reduced by using the FSC of the present embodiment, with provisions made to switch between RGB light sources at high speed, thereby enabling the apparatus to be constructed using a single liquid crystal panel that does not have color filters. This arrangement contributes to reducing the overall size of the apparatus. As a result, in the case of the direct-view type, the apparatus can be applied as a viewfinder for use in a portable apparatus such as a digital still camera or a video camera, while in the case of the projection type, a portable projection apparatus can be achieved.

FIG. 13 shows one example of the optical system.

As shown in FIG. 13, the illuminating light beam 81 is incident obliquely on the reflective liquid crystal display device 86, and the image light beam 87 emerges obliquely from the reflective liquid crystal display device 86.

A polarizer 83 is disposed diagonally to the front left of the reflective liquid crystal display device 86 in the plane of the figure, and an analyzer 84 is disposed diagonally to the front right of the reflective liquid crystal display device 86 in the plane of the figure. An illumination lamp 80 is located forward in the direction of the optical axis on which the reflective liquid crystal display device 86 and the polarizer 83 are disposed, and a projection lens 82 is located forward in the direction of the optical axis on which the reflective liquid crystal display device 86 and the analyzer 84 are disposed. The illumination lamp 80 is made up of R (red), G (green), and B (blue) light sources which are driven in a time-division fashion.

The illuminating light beam 81 entering the polarizer 83 emerges as a prescribed linearly polarized light beam (for example, P polarized light) which enters the reflective liquid crystal display device 86 obliquely, and the image light beam 87 whose polarization state has been changed so as to match the display state of the pixel emerges from the reflective liquid crystal display device 86. The light emerging from the reflective liquid crystal display device 86 is converted by the analyzer 84 into a light beam whose intensity is modulated by the display state of the pixel, and the resulting image is enlarged and projected through the projection lens 88 for display onto the screen or the like (not shown).

In the above-described configuration, by variably setting the end timings of the light-emission periods for the respective RGB light sources, as shown in FIGS. 1 and 7, the white balance can be adjusted correctly without being influenced by the response time of the LCOS liquid crystal panel 86.

What is claimed is:

1. A display apparatus, which comprises a light source for emitting a plurality of colored lights in sequence and in a repetitive manner and a display section for controlling transmission or reflection of the lights emitted from said light source, produces a color display by dividing each field into a plurality of subfields and by causing a designated one of said plurality of colored lights to be emitted at least during a part of a period within said plurality of subfields, thereby displaying on said display section an image corresponding to said designated colored light, wherein each of said subfields includes at least a data writing period for writing display data to said display section and a light-emission period for emitting said designated colored light, the apparatus further comprising a control input terminal to which a control input signal for setting an end timing of said light-emission period is applied, wherein said subfield begins with said data writing period, and when the end timing of said light-emission period is set by said control input signal so as to provide the shortest light-emission period, said light-emission period ends within said subfield period, but when the end timing of said light-emission period is set by said control input signal so as to provide the longest light-emission period, said light-emission period ends within the next subfield period.

2. A display apparatus, which comprises a light source for emitting a plurality of colored lights in sequence and in a repetitive manner and a display section for controlling transmission or reflection of the lights emitted from said light source, produces a color display by dividing each field into a plurality of subfields and by causing a designated one of said plurality of colored lights to be emitted at least during a part of a period within said plurality of subfields. thereby displaying on said display section an image corresponding to said designated colored light, wherein each of said subfields includes at least a data writing period for writing display data to said display section and a light-emission period for emitting said designated colored light, the apparatus further comprising a control input terminal to which a control input signal for setting an end timing of said light-emission period is applied, wherein said control input signal sets the end timing of said light-emission period for each of said plurality of colored lights, and wherein the number of control bits of said control input signal for at least one of said plurality of colored lights is different from the number of control bits for the other ones of said plurality of colored lights.

* * * * *